United States Patent [19]

Fujiwara et al.

[11] Patent Number: 4,527,176
[45] Date of Patent: Jul. 2, 1985

[54] MULTI-COLOR PEN RECORDER

[75] Inventors: Mitsugu Fujiwara; Yoshinori Sakaue, both of Morioka; Tomio Aso, Kitakami; Koshiro Kurokawa, Hanamaki; Hideo Obara, Ezuriko, all of Japan

[73] Assignee: Alps Electric Co., Ltd., Tokyo, Japan

[21] Appl. No.: 507,709

[22] Filed: Jun. 23, 1983

[30] Foreign Application Priority Data

Jun. 24, 1982 [JP] Japan .................. 57-94978[U]
Jun. 24, 1982 [JP] Japan .................. 57-94982[U]
Jun. 28, 1982 [JP] Japan .................. 57-96916[U]
Jun. 28, 1982 [JP] Japan .................. 57-96917[U]

[51] Int. Cl.³ ............................................ G01D 15/16
[52] U.S. Cl. .................................... 346/141; 346/49
[58] Field of Search .............. 346/141, 46, 49, 139 R, 346/139 C, 50-52; 400/18-20

[56] References Cited

U.S. PATENT DOCUMENTS

4,274,102  6/1981  Lum ........................ 346/46
4,405,931  9/1983  Fujisawa .................. 346/139 R
4,441,109  4/1984  Fujisawa .................. 346/139 R Primary Examiner—E. A. Goldberg
Assistant Examiner—A. Evans
Attorney, Agent, or Firm—Guy W. Shoup; Gerard F. Dunne

[57] ABSTRACT

A multi-color pen recorder comprises a platen rotatable about its own axis, a pen carriage mounted on the platen and movable axially therealong, a pen holder removably mounted on the pen carriage for removably supporting a plurality of pens on the pen holder, and a hammer mounted on the pen carriage for pushing one of the pens in a position on the pen holder toward the platen.

16 Claims, 13 Drawing Figures

MULTI-COLOR PEN RECORDER

BACKGROUND OF THE INVENTION

The present invention relates to a multi-color pen recorder suitable for use in devices such as X-Y plotters, graphic printers, alphanumeric printers and the like.

Recently, personal computers are becoming popular and are being used even in the home. It is also a current tendency that display devices such as a CRT (Cathode Ray Tube) used in combination with personal computers are designed and constructed to make a color display of graphs, patterns or characters.

However, only few proposals have been made hitherto for recording devices which can make a hard copy in color for permanent preservation of the characters or data as a result of operation of the personal computers. The multi-color recorders hitherto proposed are generally expensive and large-sized and, therefore, are not suitable for use in combination with personal computers.

SUMMARY OF THE INVENTION

It is an object of the present invention to provide a multi-color pen recorder which is capable of multi-color recording operation, small in size, lightweight, and inexpensive to manufacture.

Another object of the present invention is to provide a multi-color pen recorder in which a pen carriage with a plurality of pens supported thereon is smoothly movable, and the pens on the pen carriage are positioned at all times in confronting relation to a platen at a prescribed angle.

Still another object of the present invention is to provide a multi-color pen recorder having means for preventing the leading edge of a sheet of print paper from interfering with the tip end of a pen when loading the sheet around a platen.

A still further object of the present invention is to provide a multi-color pen recorder having a pen holder removably mounted on a pen carriage so that all pens can be removed from and mounted on the pen carriage in one operation, and having a hammer for pushing the pens toward a platen, the hammer being displaceable to a position in which the hammer does not interfere with removal and installation of the pen holder.

A still further object of the present invention is to provide a multi-color pen recorder having a pen holder rotatably mounted on a pen carriage and indexable reliably, the pen holder being rotatable under a light load.

According to the present invention, a multi-color pen recorder comprises a platen rotatable about its own axis, a pen carriage mounted on the platen and movable axially therealong, and a pen holder removably mounted on the pen carriage for removably supporting a plurality of pens on the pen holder. A hammer is mounted on the pen carriage for pushing the pens toward the platen one at a time. The hammer is displaceable from interfering engagement with the pen holder when the latter is removed or installed. The pen carriage with the pens installed is slidably mounted on a main shaft extending parallel to the platen. An auxiliary shaft extends parallel to the main shaft, and the pen carriage has a portion slidably supported on the auxiliary shaft. The main and auxiliary shafts are relatively positioned to determine the angle at which the pen carriage confronts the platen. The auxiliary shaft is centrally supported on a base to keep the auxiliary shaft parallel to the main shaft. In addition, the pen carriage has a guide at a side thereof facing the platen, the guide having a distal end extending to a position immediately below the one pen which is pushed by the hammer toward the platen. The distal end of the guide is bent toward the platen. The pen carriage has thereon a ratchet rotatable with the pen holder, a pawl for driving the ratchet, and a positioning body actuatable in synchronism with the pawl for pressing engagement with a peripheral surface of the pen holder.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
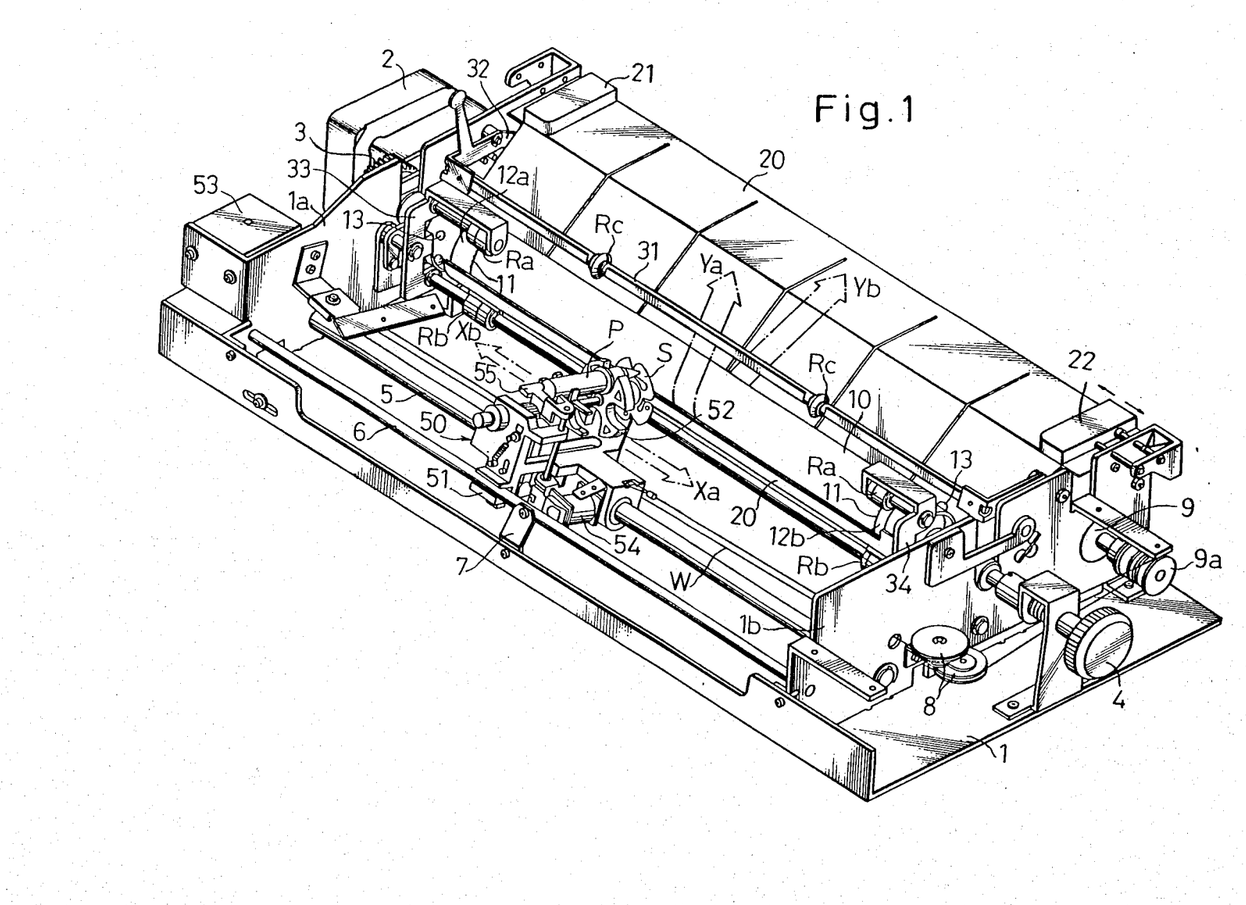
FIG. 1 a perspective view of a multi-color pen recorder according to the present invention.

FIG. 1 shows in perspective a multi-color pen recorder according to the present invention. The multi-pen recorder can draw characters, figures or other patterns on a sheet (not shown) by moving a pen P of selected ink color in the directions of the arrows Xa and Xb and actuating a platen 10 to feed the sheet in the directions of the arrows Ya and Yb.

The platen 10 can be driven to rotate about its own axis selectively in one direction or the other by a stepper motor 2 mounted on a base 1 and a gear 3. The platen 10 may manually be rotated by a knob 4 attached to an end of the shaft of the platen 10. The sheet on which characters and graphic patterns are to be drawn is inserted across and over a guide plate 20 below the platen 10 and turned up therearound in the direction of the arrow Ya. The guide plate 20 has thereon a fixed positioning member 21 and a movable positioning member 22 for guiding therebetween opposite edges of the sheet while the latter is fed below the platen 10. The movable positioning member 22 is movable in the directions of the arrows to positions in which the spacing between the positioning members 21, 22 fits differing sheet dimensions such as A4 size and B5 size. The sheet as it is fed below the platen 10 is guided by a distal end of the guide plate 20 toward a peripheral side of the platen 10 on which recording takes place. The sheet is then gripped in place between the platen 10 and two laterally spaced pairs of presser rollers Ra, Rb. The leading edge of the sheet passes in the direction of the arrow Ya below paper presser rollers Rc located above the platen 10. The paper presser rollers Rc are rotatably mounted on a paper presser bar 31 extending parallel to the platen 10, and serve to prevent the leading edge of the sheet from coming toward the pen P while recording is being effected on the sheet.

A toothed plate 11 is mounted on each of the ends of the platen 10. A respective sprocket 13 is mounted on each of the platen 10 for rotation with respective rollers 12a, 12b of short axial dimension disposed between the sprockets 13 and the toothed plates 11, 11. Where the sheet has feed holes formed in margins thereof, the projections on the sprockets 13 fit into such feed holes for positive feeding of the sheet. The sheet can therefore be fed along in the directions of the arrows Ya and Yb in full synchronism with rotation of the platen 10. In case the sheet has no feed holes, that is, the sheet is so-called letter paper, the lateral edges of the sheet are clamped between the toothed plate 11 and the presser rollers Ra, Rb. Accordingly, the sheet in the form of letter paper can positively be fed along in the directions of the arrows Ya and Yb in full synchronism with rotation of the platen 10. This positive synchronization between the feeding of the sheet and the rotation of the platen 10 serves to increase the accuracy with which characters and other patterns can be drawn on the sheet. The increased accuracy is quite important for the following reason: When drawing graphs or figures on the sheet, it is sometimes necessary to feed the sheet in the directions of the arrows Ya and Yb over a long interval while moving the pen P back and forth in the directions of the arrows Xa and Xb. If the sheet should slip on the platen 10, the sheet would not be fed along properly, causing the pattern drawn on the sheet to be distorted.

When loading and positioning the sheet, the presser rollers Ra, Rb need to be lifted off the platen 10 by raising the paper presser bar 31. More specifically, the presser rollers Ra, Rb are mounted on support members 33, 34 which can be moved away from the platen 10 in response to upward movment of a pivot lever 32 that supports the paper presser shaft 31.

The pen P is supported on a pen carriage 50. The base 1 has a pair of laterally spaced side plates 1a, 1b mounted thereon with a main shaft 5 extending between the side plates 1a, 1b parallel to the platen 10. The pen carriage 50 is slidably mounted on the main shaft 5. An auxiliary shaft 6 extends parallel to the main shaft 5 rearwardly thereof and has ends fixed to the side plates 1a, 1b. The pen carriage 50 has a rear guide slot 51 slidably fitted over the auxiliary shaft 6. The pen carriage 50 is therefore supported by both the main shaft 5 and the auxiliary shaft 6. The main shaft 5 and the auxiliary shaft 6 are relatively positioned to determine an angle at which the pen P on the pen carriage 50 is directed toward the platen 10. In the illustrated embodiment, the pen carriage 50 is angularly positioned with respect to the platen 10 so that the tip end of the pen P is oriented downwardly. The downwardly tilted tip end allows ink to flow smoothly out of the pen P. The auxiliary shaft 6 is of a diameter smaller than that of the main shaft 5. This fact, together with a relatively long distance between the side plates 1a, 1b, tends to allow the auxiliary shaft 6 to flex centrally. To avoid this, the central portion of the auxiliary shaft 6 is supported by a support base 7 mounted on the base 1. In the illustrated embodiment, the support base 7 is in the form of a metal sheet screwed to the base 1. However, the support base 7 may comprise a block or may be integrally formed with the base 1.

A wire W for driving the pen carriage 50 is attached to lateral sides of the pen carriage 50. The wire W is trained around pulleys 8 rotatably mounted on outer sides of the side plates 1a, 1b (only those on the side plate 1b being shown) and also around a drive pulley 9a of a stepper motor 9 disposed below the guide plate 10. When the stepper motor 9 is driven to rotate its drive pulley 9a in one direction or the other, the wire W moves the pen carriage 50 in the direction of the arrow Xa or Xb.

Four pens P can be supported on a pen holder 52 rotatably mounted on the pen carriage 50. (Only one pen P is shown in FIG. 1.) The pen holder 52 can be rotated by a solenoid 53 mounted on the outer side of the side plate 1a. More specifically, the main shaft 5 which is noncircular in cross section is turned about its own axis through a certain angle in response to attractive energization of the solenoid 53. The turning movement of the main shaft 5 is transmitted to a ratchet mechanism in the pen carriage 50 for angularly moving the pen holder 52 until a desired pen P is brought to a writing position (uppermost position). The pen P is normally retracted away from the platen 10 under the bias of a return leaf spring S. When a hammer 55 on the pen carriage 50 is driven by a solenoid 54 mounted thereon, the hammer 55 pushes the pen P in the writing position to press the tip end of the pen P against the platen 10.

Operation of the pen recorder thus constructed is as follows: For recording characters, graphic patterns, and the like on a sheet, the solenoid 53 is repeatedly energized to turn the main shaft 5 to cause the ratchet mechanism in the pen carriage 50 to rotate the pen holder 52. The pen holder 52 is turned continuously until a pen P with ink of a desired color is moved to the uppermost position. Thereafter, the stepper motor 2 is energized to rotate the platen 10 to feed the sheet clamped between the platen 10 and the presser rollers Ra, Rb in the directions of the arrows Ya and Yb. At the same time, the stepper motor 9 is energized to move the pen carriage 50 in the directions of the arrows Xa and Xb. The pen P is then pushed by the hammer 55 to force its tip end against the sheet on the platen 10 for thereby draw characters, a figure or a graph in the pattern dependent on movements of the sheet and the pen P in the X - Y directions. When the pen carriage 50 moves in the directions of the arrows Xa and Xb, it is guided by the main and auxiliary shafts 5, 6 while being held at an angle with respect to the platen 10 by the main and auxiliary shafts 5, 6.

Figure 2:
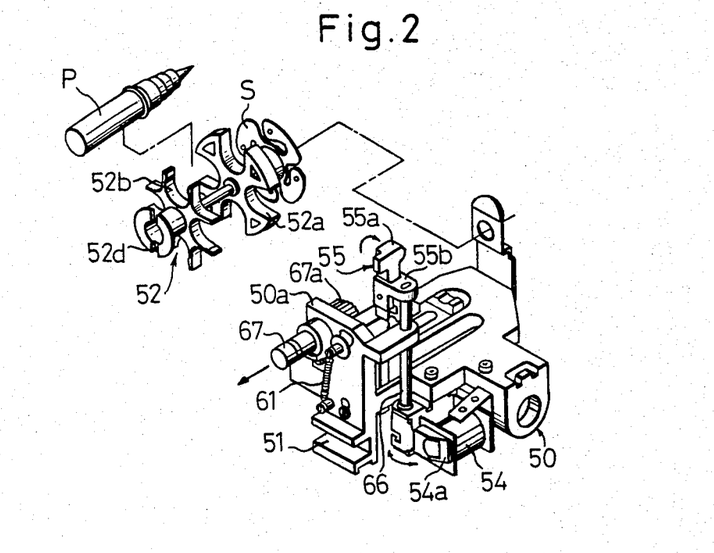
FIG. 2 is a perspective view of a pen carriage.
Figure 3:
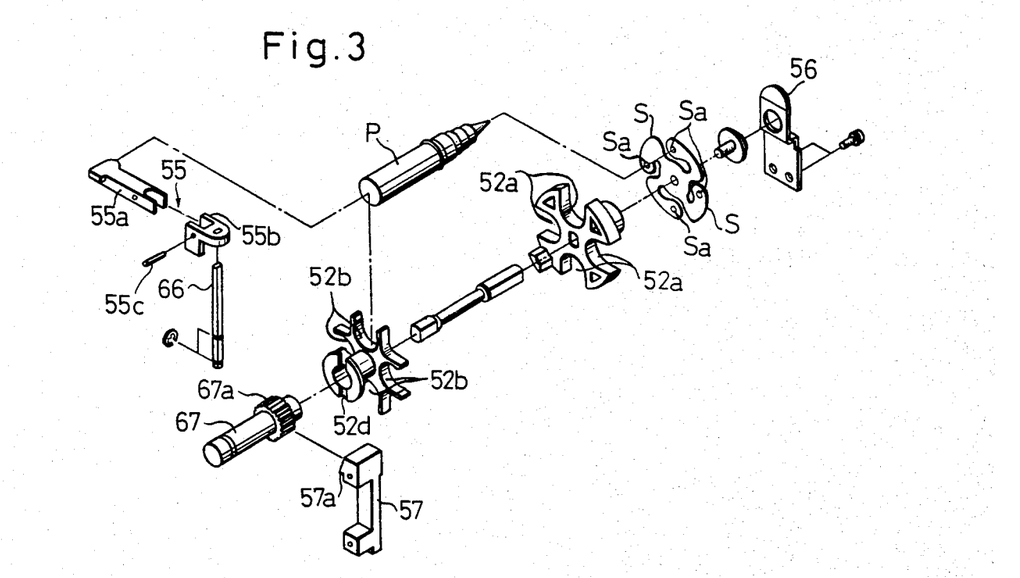
FIG. 3 is an exploded perspective veiw of a pen holder.

As shown in FIG. 2, the solenoid 54 for driving the hammer 55 has an actuator 54a to which is connected a shaft 66 having an upper end with the hammer 55 secured thereto. The hammer 55 has an abutment 55a for hitting the rear end of the pen P, the abutment 55a being coupled by a horizontal pin 55c (FIG. 3) to a hammer body 55b. As a consequence, the abutment 55a is freely pivotable upwardly on the hammer body 55b.

For writing operation, the solenoid 53 is energized to cause the main shaft 5 to move a pawl plate 57 up and down to turn a ratchet 67a and the pen holder 52 which is connected thereto, until a desired pen P is displaced to the uppermost writing position. The sheet is gripped between the platen 10 and the presser rollers Ra, Rb and fed along in the directions of the arrows Ya and Yb in response to rotation of the platen 10 driven by the stepper motor 2. The stepper motor 9 is energized to move the pen carriage 50 in the directions of the arrows Xa and Xb. The hammer 55 is actuated to press the pen P toward the platen 10 for thereby forcing the pen tip end against the sheet. A figure, graph, or the like can then be drawn on the sheet in the pattern dependent on movements of the pen P and the sheet in the X - Y directions. When the solenoid 54 is de-energized, the hammer 55 is turned in the direction to push the pen P under the force of a spring (not shown). In response to energization of the solenoid 54, the hammer 55 is moved out of engagement with the rear end of the pen P, which is then retracted away from the platen 10 under the resiliency of the return leaf spring S.

When a pen P is to be installed in position on the pen holder 52 or to be replaced with another pen P, the abutment 55a of the hammer 55 is turned upwardly about the pin 55c substantially through a right angle. Then, a ratchet shaft 67 on which the ratchet 67a is mounted is pulled in the direction of the arrow as shown in FIG. 2 out of a groove 52d defined in the rear end of the pen holder 52. The pen holder 52 is pulled upwardly or leftward (FIG. 2). With the pen holder 52 removed, all of four pens P are mounted or replaced with other four pens P. To install the pen holder 52 on the pen carriage 50, the pen holder 52 is placed in position on the pen carriage 50, and the ratchet shaft 67 is first pulled in the direction of the arrow and then released. The ratchet shaft 67 is forced under a spring bias into pressing engagement with the rear end of the pen holder 52, whereupon the ratchet shaft 67 and the pen holder 52 are coupled for corotation. Thereafter, the abutment 55a of the hammer 55 is turned downwardly to the position in which it can engage the rear end of a pen P in the uppermost writing position.

Figure 4:
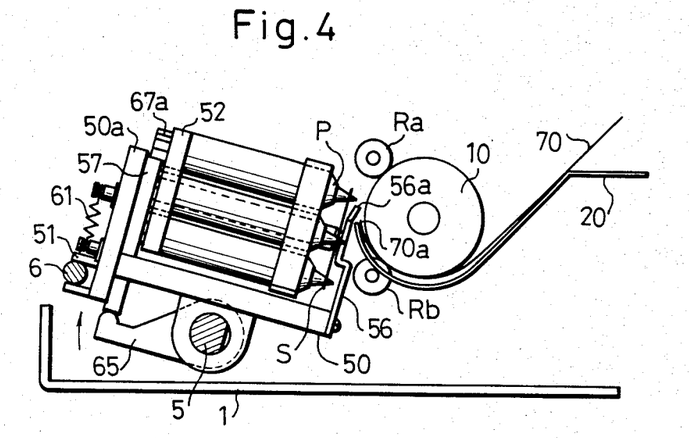
FIG. 4 is a side elevational view of the pen holder mounted on the pen carriage and positioned for printing operation.
Figure 5:
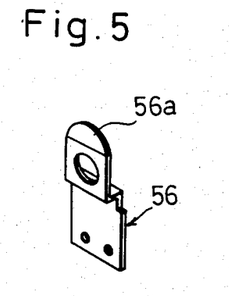
FIG. 5 is a perspective view of a support base.

As shown in FIG. 4, a sheet 70 is inserted over and across the guide plate 20 located rearward of the platen 10. At this time, the pivot lever 32 (FIG. 1) is angularly moved to displace the presser rollers Ra, Rb out of contact with the platen 10. The sheet 70 has a leading edge 70a slid over the guide plate 20 below the platen 10 to the writing peripheral side thereof. The leading edge 70a is brought into abutment against a distal end 56a of a support base 56 doubling as a guide. The distal end 56a extends to a position immediately below the tip end of the pen P placed in the uppermost writing position on the pen holder 52, and is bent toward the platen 10. Therefore, the distal sheet edge 70a is guided by the distal end 56a of the support base 56 around the platen 10 toward the presser rollers Ra without interfering with the tip end of the pen P. After the sheet 70 has been inserted, the presser rollers Ra, Rb are brought toward the platen 10 to hold the lateral edges of the sheet 70 between the platen 10 and the presser rollers Ra, Rb. The platen 10 is rotated by the stepper motor 2 to feed the sheet 70 back and forth in the directions of the arrows Ya and Yb. The pen carriage 50 is moved by the stepper motor 9 in the directions of the arrows Xa and Xb. The solenoid 54 on the pen carriage 50 is then activated to press the uppermost pen P on the pen holder 52 against the sheet 70. As a result, the pen P draws a character, figure, graph or the like in the pattern dependent on movements of the sheet and the pen P in X - Y directions.

A pen switching mechanism according to another embodiment of the invention will be described in detail with reference to FIGS. 6, 7, 8(A)–8(C) and 9(A)–9(C).

Figure 8A:
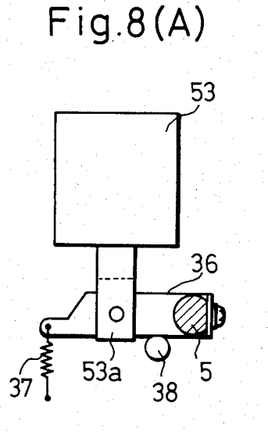
FIG. 8(A) is a side elevational view of a solenoid as it is de-energized.

A pen holder 52 with a ratchet shaft 67 connected therewith is rotatably supported between a rear wall 50a and a support base 56. The pen holder 52 has in its peripheral surface four angularly equidistant slots 52a for holding front portions of pens P and four angularly equidistant slots 52b for holding rear portions of the pens P. The slots 52a, 52b are axially aligned with one another. A pen return leaf spring S on the pen holder 52 has four small-diameter holes Sa for insertion therein of the tip ends of the pens P, which are normally biased resiliently by the spring S to move away from the platen 10 (FIG. 1). The pen holder 52 has a stopper flange 52c at a rear end thereof against which the rear ends of the pens P are held under the resiliency of the return spring S. A slot 52d formed in and across the rear end of the pen holder 52 is shaped for splined engagement with the ratchet shaft 67. A pawl plate 57 has a pawl 57a formed on an upper end thereof and held in engagement with the ratchet 67a. Two pins 58, 59 are screwed to the pawl plate 57 and extend slidably through vertical oblong holes 50b, 50c, respectively, defined in the rear wall 50a of the pen carriage 50. Thus, the pawl plate 57 is guided by the oblong holes 50b, 50c for vertical reciprocable movement. A spring 61 is connected to the pin 58 and a pin 60 secured to the rear wall 50a for resiliently urging the pawl plate 57 downwardly as shown. The pen carriage 50 has a central oblong hole 50d with a positioning body 62 disposed therein. The positioning body 62 has an arm 62a and a presser 62b, the arm 62a having a proximal end supported on a pin 63 inserted in the pen carriage 50. A spring 64 is disposed around the pin 63 and has an arm 64a engaging the arm 62a of the positioning body 62 for normally urging the arm 62a downwardly. The pen carriage 50 has a bearing 50e extending downwardly and supporting a lever 65 positioned inwardly of the bearing 50e. The lever 65 has a noncircular hole 65a in one end and a presser 65b on the other end. The bearing 50e is slidably fitted over the main shaft 5 of noncircular cross section, which extends through the hole 65a so that the lever 65 is slidably movable on and along the main shaft 5. The lower end of the pawl plate 57 and the arm 62a of the positioning body 62 are held against the upper face of the presser 65b of the lever 65. The lever 65 is driven through the main shaft 5 by the solenoid 53 mounted on the side plate 1a (FIG. 1). More specifically, the main shaft 5 has an end projecting outwardly beyond the side plate 1a and having a lever 36 affixed thereto, as shown in FIG. 8(A). The lever 36 is pivotably coupled to a plunger 53a of the solenoid 53. The lever 36 is normally biased by a spring 37 to move away from the solenoid 53 into engagement with a stop 38.

Figure 6:
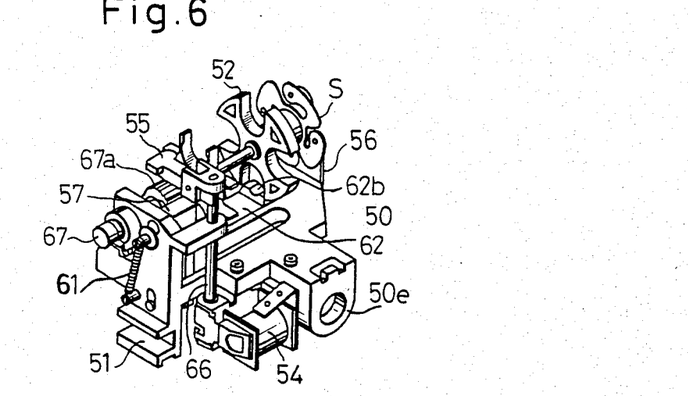
FIG. 6 is a perspective view of a pen switching mechanism to another embodiment.
Figure 7:
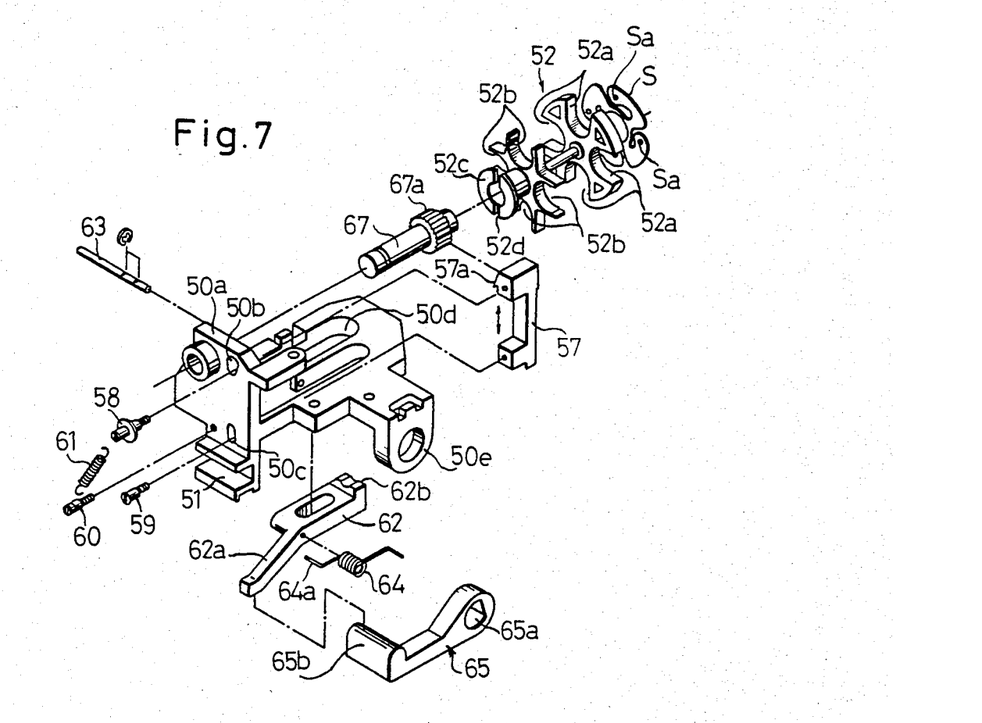
FIG. 7 an exploded perspective view of the pen switching mechanism illustrated in FIG. 6.

Rotation of the pen holder 52 causes a desired pen P to be brought up to a writing position (uppermost position). In the writing position, the rear end of the pen P is pushed by a hammer 55 to press the tip end of the pen P against a sheet held around the platen 10 (FIG. 1). The hammer 55 is fixed to a shaft 66 having a lower end secured to an actuator of a solenoid 54, as shown in FIG. 6. When the solenoid 54 remains de-energized, the hammer 55 pushes the pen P under the resilient force of a spring (not illustrated). When the solenoid 54 is energized, the hammer 55 is retracted out of engagement with the rear end of the pen P, which is moved back away from the platen 10 under the force of the return leaf spring S.

Figure 8B:
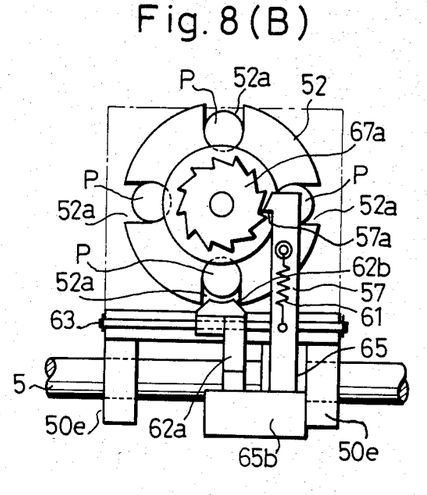
FIGS. 8(B) and 8(C) are rear and side elevational views, respectively, of the pen switching mechanism of FIG. 6 positioned with the solenoid de-energized.
Figure 8C:
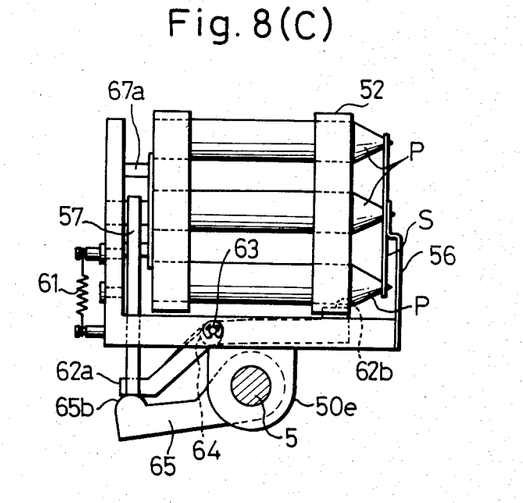
Figure 9A:
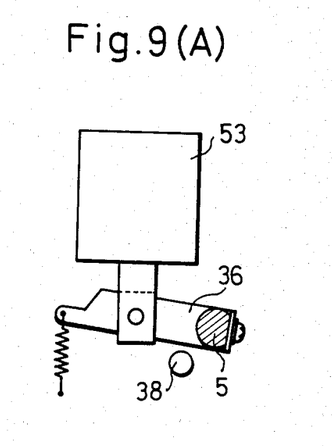
FIGS. 9(A) through 9(C) are views similar to FIGS. 8(A) through 8(C), respectively, showing the position of the parts in which the solenoid is de-energized.
Figure 9B:
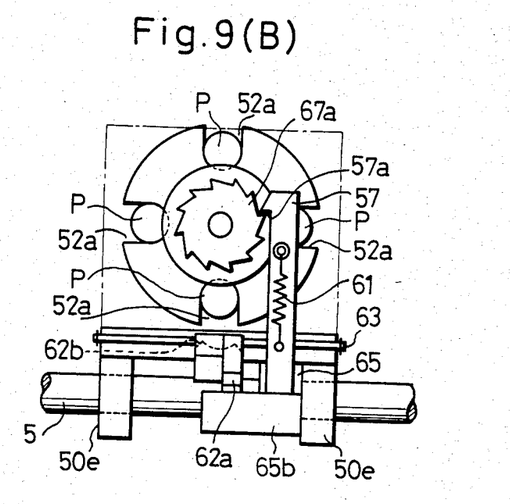
Figure 9C:
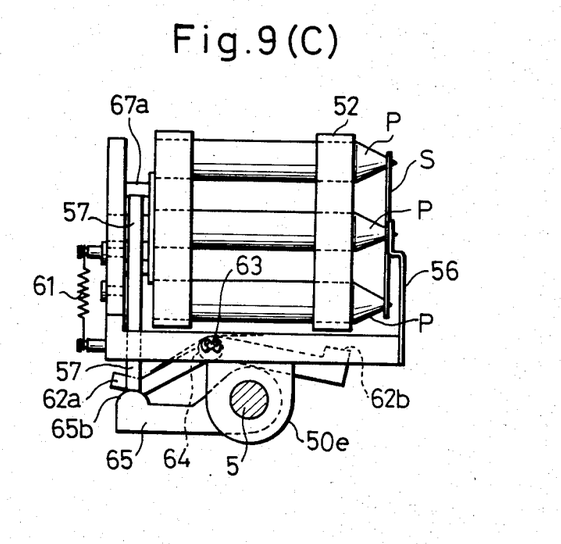

The pen switching mechanism of the foregoing construction will operate as follows:

A desired one of the four pens P held by the pen holder 52, that is, the one carrying an ink of a desired color, can be brought up to the uppermost writing position by cyclically energizing the solenoid 53. FIGS. 8(A) through 8(C) show the position of the parts in which the solenoid 53 is de-energized, while FIGS. 9(A) through 9(C) illustrate the parts position in which the solenoid 53 is energized. When the solenoid 53 is de-energized, the lever 36 secured to the end of the main shaft 5 is turned into engagement with the stop 38 under the resiliency of the spring 37. At this time, the lever 65 disposed below the pen carriage 50 turns with the main shaft 5 so that the presser 65b is lowered as shown in FIG. 8(C). The pawl plate 57 is allowed to descend under the resiliency of the spring 61, and the positioning body 62 is turned with the arm 62a in the lowered position under the force of the spring 64. The presser 62b of the positioning body 62 is now forced in fitting engagement in the lowermost one of the slots 52a in the pen holder 52 (FIG. 8(B)). The pen holder 52 is thus positioned by such engagement with the presser 62b so that the four pens P are placed in upper, lower, righthand and lefthand positions, respectively.

When the solenoid 53 is energized, the lever 36 is pulled to turn the main shaft 5 about its own axis through a prescribed angle as shown in FIG. 9(A). The lever 65 below the pen carriage 50 is also turned with the main shaft 5 to thereby lift the presser 65b, which then raises the pawl plate 57. The presser 65b also pushes up the arm 62a of the positioning body 62 until the presser 62b is lowered out of engagement with the pen holder 52, as illustrated in FIGS. 9(B) and 9(C). The solenoid 53 is de-energized again to bring the parts into the position of FIGS. 8(A) through 8(C). At this time, the pawl 57a is lowered to turn the ratchet 67a for thereby angularly moving the pen holder 52 with the ratchet 67a clockwise (FIGS. 8(B) and 9(B)) through a predetermined angle. The presser 62b of the positioning body 62 is raised into pressing engagment with the peripheral surface of the pen holder 52. By repeating the energization of the solenoid 53 several times, the pen holder 52 is rotated by the pawl 57a to bring the desired pen P up to the uppermost writing position. With the desired pen P in the uppermost writing position, the slot 52a which is in diametrically opposite relation to the desired pen P is in the lowermost position. The presser 62b of the positioning body 62 is forcibly fitted into the lowermost slot 52a to position the pen holder 52 against unwanted wobbling movement.

The platen 10 is now rotated by the stepper motor 2 to feed the sheet gripped between the platen 10 and the presser rollers Ra, Rb in the directions of the arrows Ya and Yb, as shown in FIG. 1. The pen carriage 50 is moved by the stepper motor 9 in the directions of the arrows Xa and Xb. The pen P in the uppermost writing position is pushed by the hammer 55 to press the tip end of the pen P against the sheet, whereupon a character, figure or symbol can be drawn on the sheet in the pattern dependent on movements of the sheet and the pen in X - Y directions.

While in the illustrated embodiments the solenoid 53 for driving the pawl plate 57 is located on the outer side of the side plate 1a, the solenoid 53 may be mounted on the pen carriage 50. Furthermore, the arm 62a of the positioning body 62 may be coupled to the lower end of the pawl plate 57, and only the pawl plate 57 may be driven by the lever 65.

Although certain preferred embodiments have been shown and described, it should be understood that many changes and modifications may be made therein without departing from the scope of the appended claims.

What is claimed is:

1. A multi-color pen recorder comprising:
   (a) a platen rotatable about its own axis;
   (b) a pen carriage mounted on said platen and movable axially therealong;
   (c) a pen holder removably mounted on said pen carriage for removably supporting a plurality of pens on said pen holder; and
   (d) a hammer mounted on said pen carriage for pushing one of said pens in a position on said pen holder toward said platen.

2. A multi-color pen recorder according to claim 1, wherein said pen holder is rotatable about its own axis on said pen carriage.

3. A multi-color pen recorder according to claim 2, including a guide mounted on said pen carriage at a side thereof facing said platen, said guide having a distal end positioned below said position and bent toward said platen.

4. A multi-color pen recorder according to claim 3, including said plurality of pens supported on said pen holder, said pen holder having a shaft supported by said guide.

5. A multi-color pen recorder according to claim 1, wherein said hammer includes a displaceable abutment for abutting engagement with a rear end of said one of the pens.

6. A multi-color pen recorder according to claim 1, including a base, a main shaft mounted on said base, and an auxiliary shaft extending parallel to said main shaft, said main and auxiliary shafts jointing supporting said pen carriage, said pen carriage having a portion slidably engaging said auxiliary shaft, said auxiliary shaft having opposite ends fixed to said base and a central portion supported on said base.

7. A multi-color pen recorder according to claim 2, including a ratchet mounted on said pen carriage for rotation with said pen holder, a pawl plate mounted on said pen carriage and reciprocably movable for turning said ratchet, and a positioning body mounted on said pen carriage and actuatable in synchronism with said pawl plate for pressing engagement with a peripheral surface of said pen holder only when said pen holder is held at rest.

8. A multi-color pen recorder according to claim 7, wherein said peripheral surface of said pen holder has slots for holding the pens therein, respectively, said positioning body being actuatable to fit into one at a time of said slots.

9. A recording device for recording information in any of a plurality of colors, including a platen formed in the shape of a roller and adapted to receive a recording paper wrapped partially therearound, means for rotating said paper in the circumferential direction of said platen, a carriage mounted for movement along a path parallel to the axis of said platen, said carriage carrying a pen holder adapted to support a plurality of pens, means mounting said pen holder removably to said carriage, means for positioning any one of said pens in a printing position, and means carried by said carriage for urging said pen in said printing position against the recording paper.

10. A recording device according to claim 9, said pen holder being held rotatably to said carriage and said positioning means including means for rotating said pen holder to bring a selected pen into a printing position, said pen holder being held removable to said carriage by a shaft extending axially with a central portion of said pen holder and easily removable for enabling said pen holder to be separated from said carriage.

11. A recording device according to claim 9, the surface of said carriage facing said platen carrying a paper guide serving to deflect said paper away from said carriage and toward said platen.

12. A recording device according to claim 9, said pen-urging means including a hammer having a contact portion adapted to abut the rear portion of a pen in said printing position, said contact portion being connected pivotally to said hammer to enable said contact portion to be pivoted away from the pen in said printing position to enable said pen holder to be removed easily.

13. A recording device according to claim 9, including a base, said carriage being mounted slidably to a main shaft supported by said base, and an auxiliary shaft supported by said base and extending parallel to said main shaft for supporting slidably a rear portion of said carriage, and means connected to said base for suporting a central portion of said auxiliary shaft.

14. A recording device according to claim 13, said rear portion of said carriage having a slotway receiving said auxiliary shaft.

15. A recording device according to claim 9, said pen holder being held rotatably to said carriage, and means for rotating said pen holder to bring a selected pen into a printing position, said rotating means including a ratchet mounted on said carriage for unitary rotation with said pen holder, a pawl adapted to engage said ratchet and adapted to move linearly to rotate said ratchet incrementally, means for moving said pawl to increment said ratchet, and means for holding said pen holder in a selected position, said holding means releasing said pen holder when said pawl-moving means is actuated.

16. A recording device according to claim 15, said pen holder having a plurality of circumferential slots for holding said pens and said holding means serving to fit within one of said slots to hold said pen holder in a selected position.

* * * * *